(12) United States Patent
Huang et al.

(10) Patent No.: US 12,083,679 B2
(45) Date of Patent: Sep. 10, 2024

(54) MOBILE ROBOT AND STABILIZATION METHOD FOR THE MOBILE ROBOT

(71) Applicant: DELTA ELECTRONICS, INC., Taoyuan (TW)

(72) Inventors: Cheng-Hao Huang, Taoyuan (TW); Po-Chiao Huang, Taoyuan (TW); Han-Ching Lin, Taoyuan (TW); Shi-Yu Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 266 days.

(21) Appl. No.: 17/881,357

(22) Filed: Aug. 4, 2022

(65) Prior Publication Data

US 2023/0302638 A1 Sep. 28, 2023

(30) Foreign Application Priority Data

Mar. 22, 2022 (CN) .......................... 202210284402.3

(51) Int. Cl.
*G05D 1/00* (2024.01)
*B25J 5/00* (2006.01)
*B25J 9/16* (2006.01)

(52) U.S. Cl.
CPC ............. *B25J 9/1641* (2013.01); *B25J 5/007* (2013.01)

(58) Field of Classification Search
CPC ........ B25J 9/1641; B25J 5/007; G05D 1/0094
See application file for complete search history.

(56) References Cited

U.S. PATENT DOCUMENTS

| 8,939,056 | B1 * | 1/2015 | Neal, III | F42B 15/22 89/1.51 |
| 10,124,880 | B1 * | 11/2018 | Ellzey | B64C 5/12 |
| 11,120,388 | B2 * | 9/2021 | Zhang | G06Q 10/08 |
| 11,703,862 | B2 * | 7/2023 | Kikani | G05D 1/0212 701/27 |
| 11,820,507 | B2 * | 11/2023 | Raptopoulos | G08G 5/025 |

FOREIGN PATENT DOCUMENTS

| CN | 111716354 A | 9/2020 |
| CN | 113799105 A | 12/2021 |
| CN | 113814954 A | 12/2021 |

(Continued)

OTHER PUBLICATIONS

Office Action dated Nov. 2, 2022 of the corresponding Taiwan patent application No. 111110506.

(Continued)

*Primary Examiner* — Dalena Tran
(74) *Attorney, Agent, or Firm* — Chun-Ming Shih; HDLS IPR SERVICES

(57) ABSTRACT

A stabilization method incorporated with a mobile robot having a body, a plane-pressure sensor, and a movement mechanism is disclosed and includes the following steps: sensing and obtaining a pressure distribution of the body through the plane-pressure sensor; computing a center of gravity (CoG) position of the body in accordance with the pressure distribution; determining whether the CoG position is located within a steady zone pre-defined upon the body; and, providing a reverse force toward a CoG offset direction of the CoG position when the CoG position is determined to be off the steady zone.

14 Claims, 8 Drawing Sheets

(56) References Cited

FOREIGN PATENT DOCUMENTS

| | | |
|---|---|---|
| JP | H054177 A | 1/1993 |
| JP | 2006123854 A | 5/2006 |
| JP | 2019117431 A | 7/2019 |

OTHER PUBLICATIONS

Office Action dated Oct. 10, 2023 of the corresponding Japan patent application No. 2022-149539.
Office Action dated Jul. 18, 2023 of the corresponding Japan patent application No. 2022-149539.

* cited by examiner

MOBILE ROBOT AND STABILIZATION METHOD FOR THE MOBILE ROBOT

BACKGROUND OF THE DISCLOSURE

Technical Field

The present disclosure relates to a mobile robot, and specifically to a mobile robot and a stabilization method for the mobile robot.

Description of Related Art

Recently, the requirement for mobile robots constantly increases, different types of mobile robots such as autonomous guided vehicles (AGV) and autonomous mobile robots (AMR) are becoming popular to the world.

To prevent the mobile robot from overturning when the center of gravity (CoG) of the mobile robot exceeds the chassis of the mobile robot during movement, the manufacturer of the mobile robot usually overweighs the chassis of the mobile robot and balances the weight of the chassis. Therefore, the CoG of the whole mobile robot may be located within the central position of the body of the mobile robot.

However, the above approach makes the entire mobile robot bulky. Besides, when the quantity of payloads put on the mobile robot increases and causes the CoG of the mobile robot to be higher, the mobile robot may easily cause the payloads to vibrate when rapidly accelerating or braking. Therefore, the mobile robot itself may easily overturn due to incapable of ensuring the status of the payloads.

In sum, an effective mechanism that may dynamically adjust the CoG position of the whole mobile robot to prevent the mobile robot from overturning is required in the technical field.

SUMMARY OF THE DISCLOSURE

The present disclosure is directed to a mobile robot and a stabilization method for the mobile robot, which may monitor the inertia and the change of CoG of a mobile robot and dynamically compensate the CoG position.

In one of the exemplary embodiments, the mobile robot includes:
- a body having a chassis, wherein the chassis is arranged with a movement mechanism;
- a plane-pressure sensor arranged on the body, sensing a pressure distribution of the body to obtain a center of gravity (CoG) position of the body;
- a movable tool arranged on the body; and
- a controller connected with the movement mechanism, the plane-pressure sensor, and the movable tool, configured to control the movement mechanism or the movable tool to perform
- a CoG compensation action when the CoG position is located out of a steady zone of the body by applying a reverse force against a CoG offset direction for the CoG position to return to the steady zone, wherein the CoG offset direction is a direction of offset of the CoG position with respect to the stable region.

In one of the exemplary embodiments, the stabilization method is incorporated with the mobile robot mentioned above and includes the following steps:
a) sensing a pressure distribution of the body through the plane-pressure sensor;
b) computing a certer of gravity (CoG) position of the body based on the pressure distribution; and
c) performing a CoG compensation action when determining that the CoG position is located out of a steady zone that is close to a central position of the body, wherein the CoG compensation action is performed to provide a reverse force against a CoG offset direction of the CoG position with respect to the steady zone.

In one of the exemplary embodiments, the stabilization method is incorporated with the mobile robot mentioned above and includes the following steps:
a) sensing a pressure distribution of the body through the plane-pressure sensor;
b) computing a center of gravity (CoG) position of the body based on the pressure distribution;
c) determining whether the CoG position is located within a steady zone or a compensation zone, wherein the steady zone is close to a central position of the body and the compensation zone is close to a peripheral position of the body;
d) determining whether a payload that is movable exists on the body;
e) controlling the movable tool to perform a posture adjustment procedure when no payload exists on the body or an immovable payload exists on the body, wherein the posture adjustment procedure is performed to adjust a position and a posture of the movable tool so that a tool CoG of the movable tool moves toward an opposite direction to a CoG offset direction of the CoG position with respect to the steady zone;
f) confirming a distribution of the payload based on the pressure distribution when the payload that is movable exists on the body; and
g) after the step f), controlling the movable tool to move the payload toward the opposite direction.

The present disclosure may dynamically compensate the CoG position of the mobile robot through monitoring and controlling the mobile robot, so as to prevent the body of the mobile robot from overturning. Therefore, it is unnecessary for the manufacturer to add weight to the chassis of the mobile robot, so that the mobile robot may be manufactured in a lightweight design. In addition, through the approach of dynamically adjusting the CoG position, the mobile robot may be prevented from overturning even if the quantity of payloads on the mobile robot increases, the CoG position becomes higher, or the payloads on the mobile robot shake.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

Figure 1:
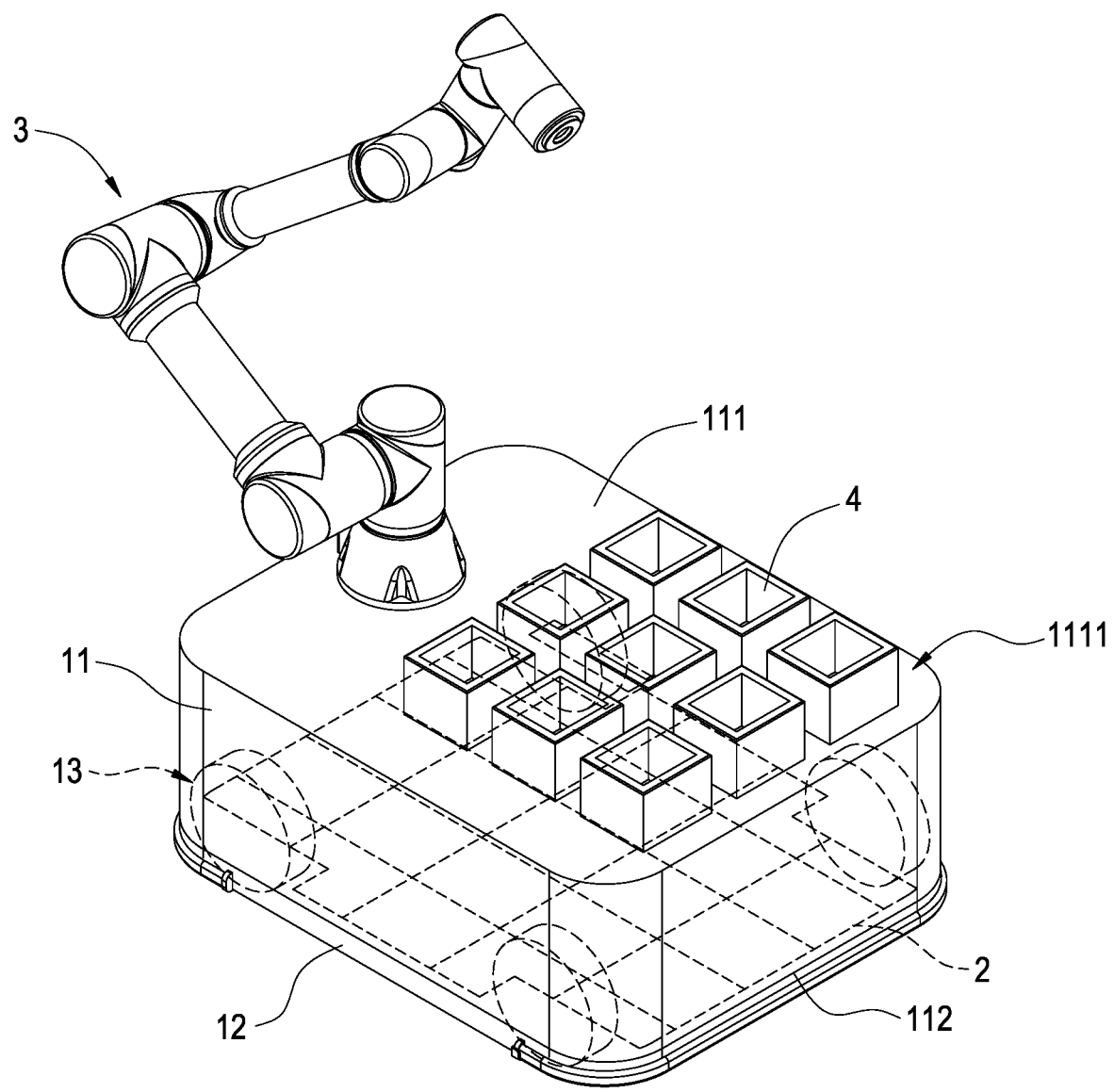
FIG. 1 is a schematic diagram of a mobile robot of a first embodiment according to the present disclosure.

Please refer to FIG. 1, which is a schematic diagram of a mobile robot of a first embodiment according to the present disclosure. The present disclosure discloses a mobile robot 1. As shown in FIG. 1, the mobile robot 1 includes a body 11, a chassis 12 arranged at one side of the body 11, a movement mechanism 13 arranged on the chassis 12, a plane-pressure sensor 2 arranged on the body 11, and a movable tool 3. In the embodiment of FIG. 1, the mobile robot 1 is an autonomous mobile robot (AMR) or an autonomous guided vehicle (AGV), but not limited.

One technical feature of the present disclosure is that, when the center of gravity (CoG) of the mobile robot 1 becomes unstable, the mobile robot 1 may control the movement mechanism 13 or the movable tool 3 to operate in real-time to compensate for the CoG position. Therefore, the mobile robot 1 may be prevented from overturning. In the present disclosure, when the CoG position of the mobile robot 1 exceeds a pre-defined range, the CoG of the mobile robot 1 is regarded as unstable.

As shown in FIG. 1, the body 11 has a top face 111 and a bottom face 11, the chassis 12 is arranged at the bottom face 112 of the body 11, and the movement mechanism 13 is arranged under the chassis 12. In the embodiment, the movement mechanism 13 is exemplified as wheels respectively arranged at corners of the chassis 12, but not limited thereto. In another embodiment, the movement mechanism 13 may be implemented by one or more conveyors that can bring the body 11 to move against the ground. However, the above descriptions are only few embodiments of the present disclosure, but not limited thereto.

Figure 2:
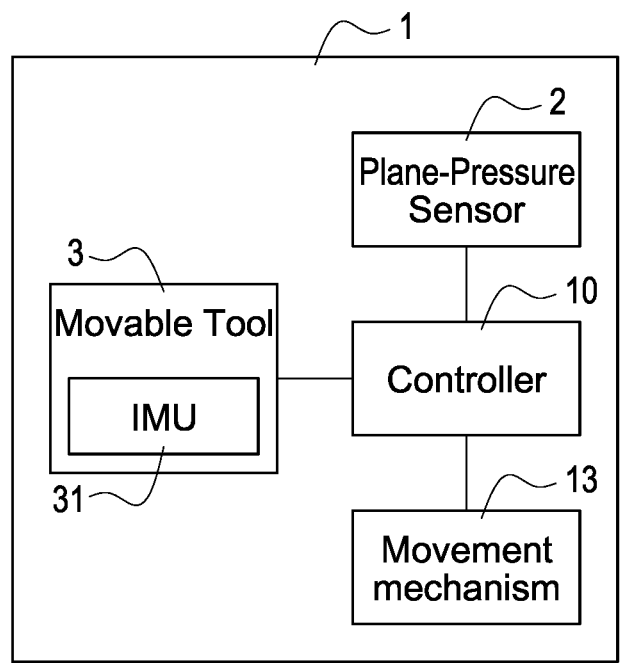
FIG. 2 is a block diagram of a mobile robot of an embodiment according to the present disclosure.

The plane-pressure sensor 2 may be a capacitive transducer or an inductive transducer, but not limited. In the embodiment of FIG. 1, the plane-pressure sensor 2 is arranged at the surface of one side of the chassis 12 and parallel to the chassis 12. Therefore, the plane-pressure sensor 2 may be used to sense the pressure value at multiple location points of the body 11 on a horizontal plane. Through the reference of the pressure values at the multiple location points of the body 11, a controller (such as the controller 10 as shown in FIG. 2) of the mobile robot 1 may determine a current pressure distribution of the body 11. Also, the controller 10 may compute a current position of the center of gravity (i.e., a CoG position) of the mobile robot 1 in accordance with the pressure distribution.

In another embodiment, the movement mechanism 13 includes multiple wheels respectively arranged under the chassis 12, and the plane-pressure sensor 2 includes multiple pivot pressure sensors (not shown) respectively arranged on the axle pivot of each wheel. In the embodiment, the controller 10 executes an algorithm to compute the pressure values of the multiple pivot pressure sensors, so as to analyze the pressure distribution of the body 11 and to compute the CoG position of the mobile robot 1 in accordance with the pressure distribution.

However, the above description is only one embodiment of the present disclosure, but not limited thereto.

In the embodiment of FIG. 1, the movable tool 3 is exemplified as a robotic arm that may move within a three-dimensional space. As shown in FIG. 1, the body 11 has a payload area 1111 on the top face 111, and one or more payloads 4 being transported by the mobile robot 1 may be put on the payload area 1111. It should be mentioned that the CoG position of the mobile robot 1 may change whenever the robotic arm grabs the payload 4 from or puts the payload 4 onto the payload area 1111. In such scenario, the mobile robot 1 may overturn due to the placement of the payload 4. To prevent the above problem, the present disclosure may compensate the CoG position of the mobile robot 1 in real-time.

Figure 3:
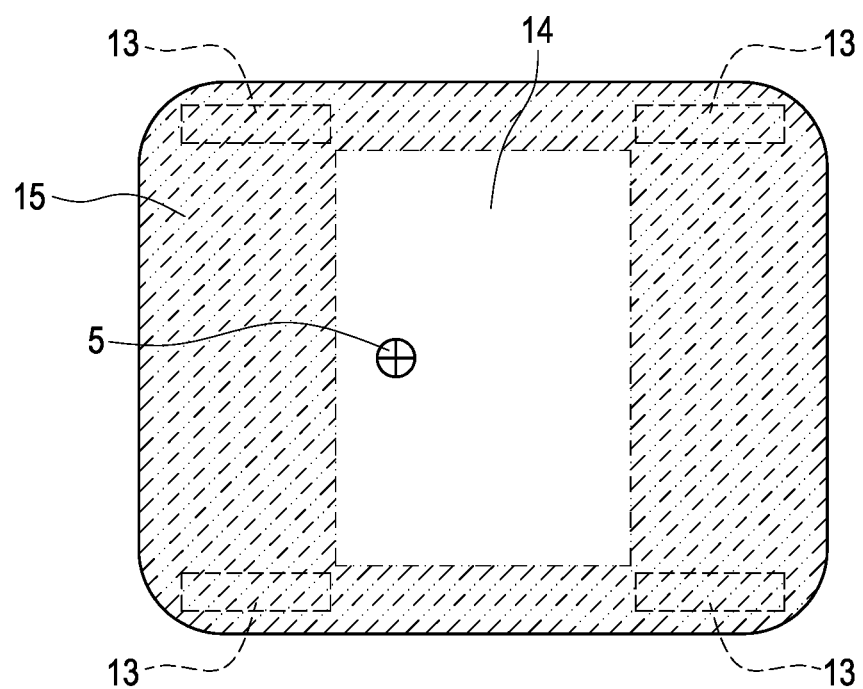
FIG. 3 is a schematic diagram showing a CoG position of a mobile robot of an embodiment according to the present disclosure.

Please refer to FIG. 2 and FIG. 3, wherein FIG. 2 is a block diagram of a mobile robot of an embodiment according to the present disclosure and FIG. 3 is a schematic diagram showing a CoG position of a mobile robot of an embodiment according to the present disclosure.

As shown in FIG. 2, the mobile robot 1 includes a controller 10, and the controller 10 is connected with the movement mechanism 13, the plane-pressure sensor 2, and the movable tool 3. In the present disclosure, the controller 10 controls the movement mechanism 13 or the movable tool 3 based on the pressure value(s) outputted from the plane-pressure sensor 2 in order to compensate the CoG position of the mobile robot 1.

FIG. 3 shows a top view of the body 11. As shown in FIG. 3, a steady zone 14 and a compensation zone 15 are pre-defined upon the body 11, wherein the position of the steady zone 14 is close to a central position of the body 11 and the position of the compensation zone 15 is close to a peripheral position of the body 11. More specific, when a CoG position 5 of the whole mobile robot 1 is located within the steady zone 14, the mobile robot 1 has no risk of overturning. On the other hand, when the CoG position 5 of the whole mobile robot 1 is located within the compensation zone 15, the CoG of the mobile robot 1 is unstable and the mobile robot 1 is under the risk of overturning.

In the present disclosure, the plane-pressure sensor 2 keeps sensing and outputting the pressure value of each location point of the body 11, and the controller 10 computes the CoG position 5 of the whole mobile robot 1 based on the pressure value outputted by the plane-pressure sensor 2. When the CoG position 5 is determined to be within the steady zone 14, the controller 10 may perform no action. On the other hand, when the CoG position 5 is determined to be within the compensation zone 15, the controller 10 controls the movement mechanism 13 or the movable tool 3 to perform a CoG compensation action.

Figure 6:
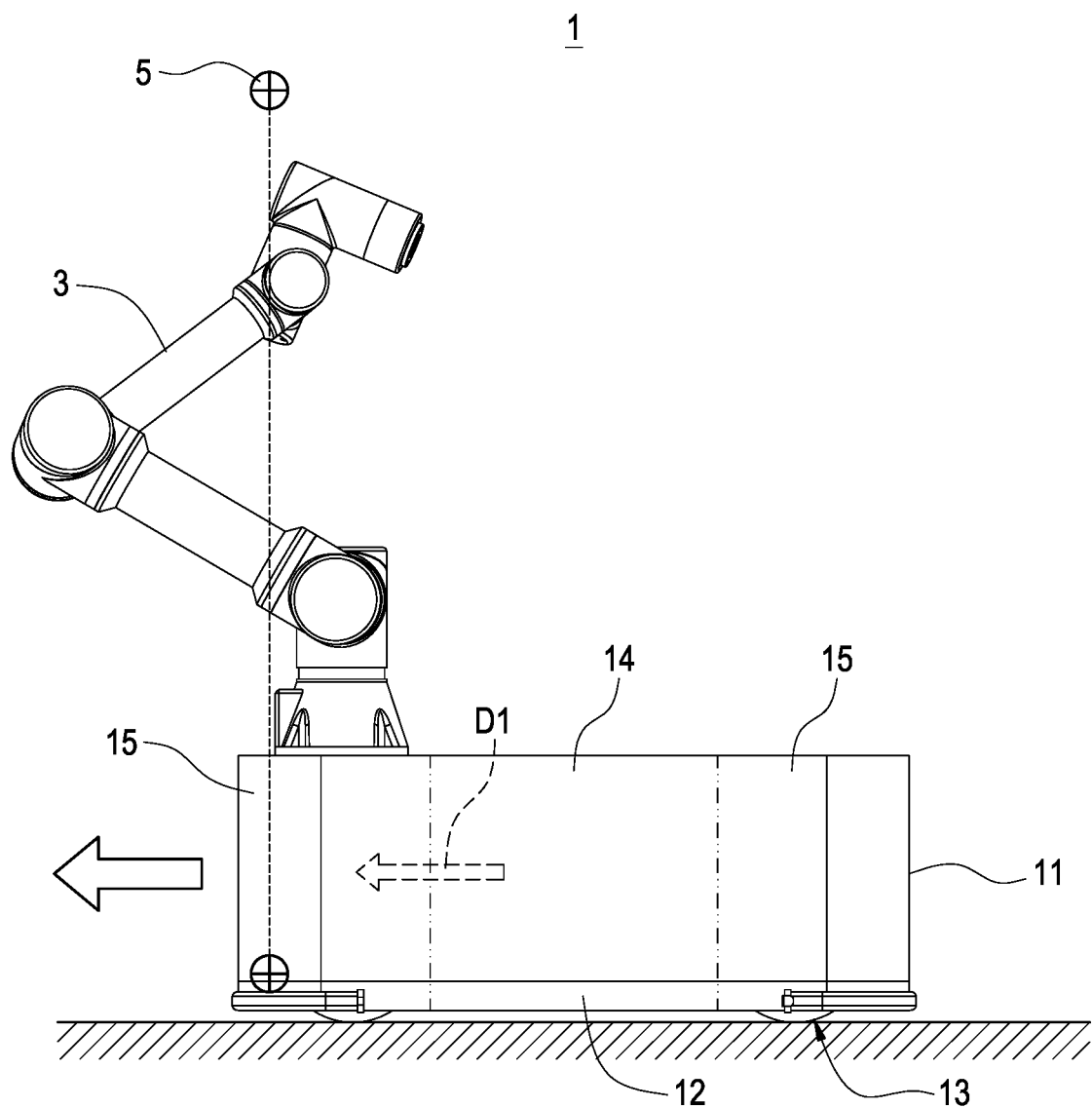
FIG. 6 is a schematic diagram showing a CoG compensation action of a first embodiment according to the present disclosure.

In particular, when the CoG position 5 is located within the compensation zone 15, the controller 10 may compute a CoG offset direction (such as the CoG offset direction D1 as shown in FIG. 6) of the current CoG position 5 with respect to the steady zone 14. The CoG compensation action of the present disclosure is to control the movement mechanism 13 and/or the movable tool 3 to operate correspondingly to provide a reverse force against the CoG offset direction D1.

By applying the reverse force to the body 11, the CoG position 5 of the mobile robot 1 may be moved from the compensation zone 15 back to the steady zone 14. In the embodiment shown in FIG. 6, the CoG offset direction D1 preferably is from the center of the stable region to the current CoG position 5. In another embodiment, the CoG offset direction D1 may be from the CoG in an initial state, i.e., without any payload and/or its robotic arm in a default position, to the current CoG position 5.

In one embodiment, the CoG compensation action is to control the movement mechanism 13 (such as the wheels or the conveyor) to move toward the CoG offset direction D1; therefore, the reverse force may be provided by the forward force of the mobile robot 1. In the embodiment, if the CoG offset direction D1 and a preset cruise direction of the mobile robot 1 are different, the mobile robot 1 may first move toward the CoG offset direction D1 to provide the reverse force and then move ahead toward the preset cruise direction after the CoG position 5 is moved back to the steady zone 14. Therefore, the effect of CoG compensation may be approached even during the movement of the mobile robot.

In another embodiment, the CoG compensation action is to control the movable tool 3 to perform a posture adjustment procedure. In particular, the posture adjustment procedure is for the movable tool 3 to adjust its current position and current posture, so as to make a tool CoG of the movable tool 3 to move toward an opposite direction against the CoG offset direction D1 in order to provide the reverse force to the body 11.

As shown in FIG. 2, the movable tool 3 may include an inertial measurement unit (IMU) 31, which is used to measure an inertia change of the movable tool 3. The IMU 31 may be implemented by a combination of an accelerometer and a gyroscope, and is used to measure and record information such as an acceleration and a tilted status of the movable tool 3, but not limited thereto.

In the present disclosure, the movable tool 3 may compute the tool CoG of the movable tool 3 based on the inertia change measured by the IMU 31. In the above embodiment, the movable tool 3 performs the posture adjustment procedure based on the tool CoG. For example, the movable tool 3 may decide its position and posture in accordance with the tool CoG; therefore, the movable tool 3 may achieve the purpose of providing the reverse force to the body 11 through adjusting the tool CoG of the movable tool 3.

In another embodiment, the CoG compensation action is to move the placement position of the payload 4 being put on the payload area 1111 toward an opposite direction against the CoG offset direction D1, so as to provide the reverse force to the body 11. In particular, the CoG compensation action is controlling the movable tool 3 to move the payload 4 toward an opposite direction against the CoG offset direction D1.

In one embodiment, the movable tool 3 may be a robotic arm. The CoG compensation action in the embodiment is controlling the movable tool 3 to grab the payload 4 on the payload area 1111 and change the placement position of the grabbed payload 4 along an opposite direction that is against the CoG offset direction D1.

It is worth saying that the robotic arm may perform a three-dimensional dynamic identification procedure. The dynamic identification procedure may estimate the CoG position of the robotic arm in a three-dimensional environment based on each axis's status in real-time when the robotic arm is operating or grabbing the payload(s). The value estimated by the dynamic identification procedure may be regarded as the tool CoG of the movable tool 3 as mentioned above.

However, the above description is only one embodiment of the present disclosure, but not limited thereto.

Figure 4:
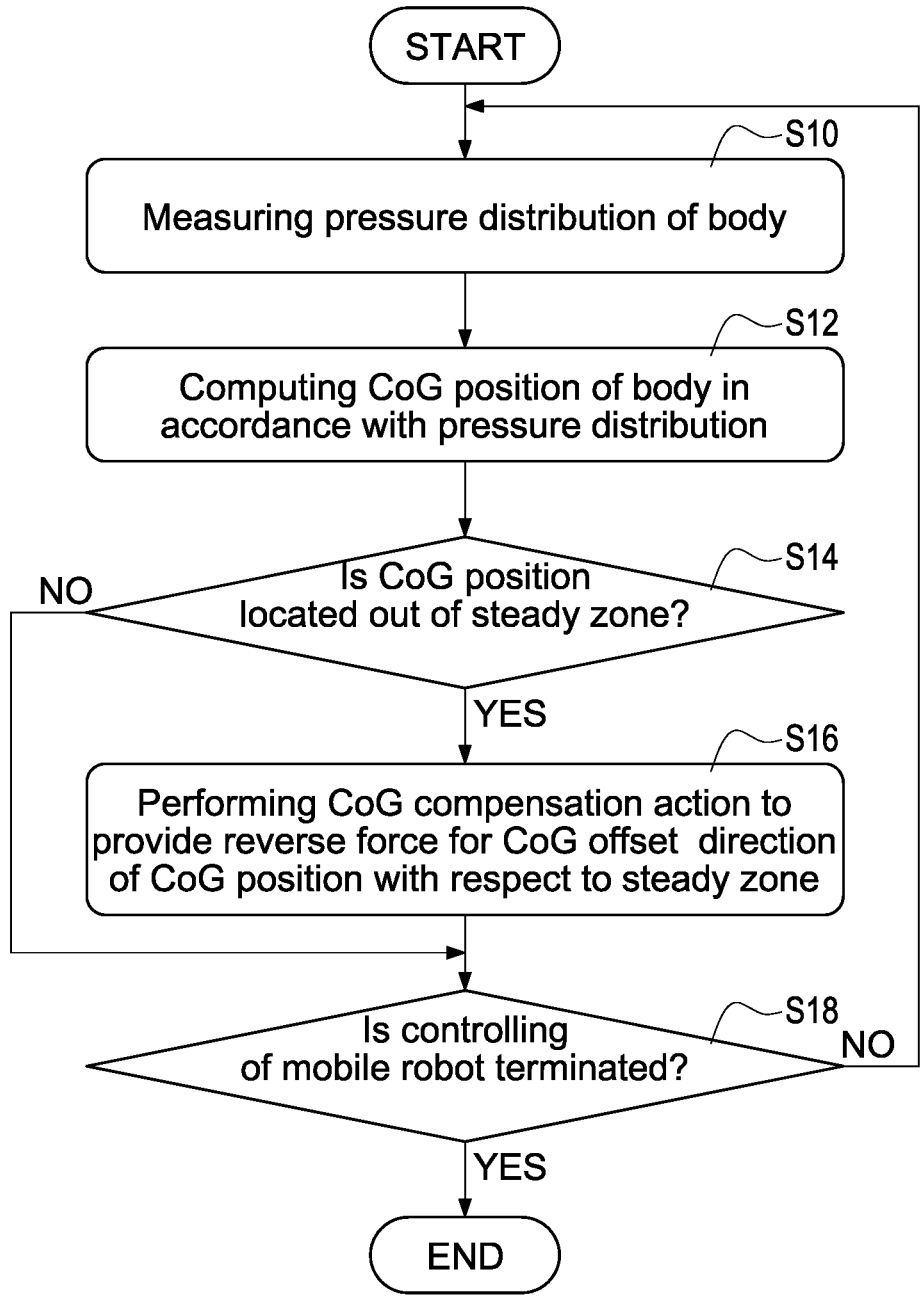
FIG. 4 is a flowchart of a stabilization method of a first embodiment according to the present disclosure.

Please refer to FIG. 1 through FIG. 4, wherein FIG. 4 is a flowchart of a stabilization method of a first embodiment according to the present disclosure. FIG. 4 discloses a stabilization method for the mobile robot (referred to as the stabilization method hereinafter), the stabilization method may be incorporated with the mobile robot 1 as shown in FIG. 1 to FIG. 3, but not limited.

As disclosed in FIG. 4, the stabilization method of the present disclosure first measures the pressure distribution of the body 11 through the plane-pressure sensor 2 on the mobile robot 1 (step S10), and the controller 10 computes a center of gravity position 5 (i.e., the CoG position 5) of the body 11 in accordance with the pressure distribution (step S12).

After the step S12, the controller 10 determines whether the CoG position 5 is located out of the steady zone 14 that is pre-defined upon the body 11 (step S14). If the CoG position 5 is located within the steady zone 14, the controller 10 does not have to perform any compensation action.

As disclosed above, the movable tool 3 may have an IMU 31 that is used to measure the inertia change of the movable tool 3. In another embodiment, the controller 10 may control the movable tool 3 to perform a vibration suppression control procedure based on the measured value of the IMU 31 if the CoG position 5 is determined to be within the steady zone 14. Therefore, the controller 10 may perform a suppression to the regular vibration of the mobile robot 1.

If the controller 10 determines in the step S12 that the CoG position 5 of the mobile robot 1 is located out of the steady zone 14 upon the body 11 (e.g., the CoG position 5 is located within the compensation zone 15), the controller 10 may perform the CoG compensation action (step S16). In the present disclosure, the CoG compensation action is an inverted pendulum-like movement. In particular, the CoG compensation action is performed to provide a reverse force against the CoG offset direction D1 of the CoG position 5 with respect to the steady zone 14. By providing the reverse force directly to the body 11, the controller 10 may return the CoG position 5 back to the steady zone 14 and restore the mobile robot 1 to be stable.

Please refer to FIG. 6, which is a schematic diagram showing a CoG compensation action of a first embodiment according to the present disclosure. In the embodiment of FIG. 6, the controller 10 controls the movement mechanism 13 (such as the wheels or the conveyor) of the body 11 to perform the CoG compensation action when the CoG position 5 is determined to be out of the steady zone 14 (e.g., the CoG position 5 is located within the compensation zone 15).

As disclosed in FIG. 6, the CoG compensation action is that the controller 10 controls the movement mechanism 13 to move toward the current CoG offset direction D1. In other words, the CoG compensation action is that the controller 10 controls the movement mechanism 13 to operate so that the entire mobile robot 1 may move toward the CoG offset direction D1. The forward force made by the mobile robot 1 may provide the reverse force against the CoG offset direction D1; thereby, making the CoG position 5 to move from the compensation zone 15 back to the steady zone 14. It is worth saying that, when the CoG offset direction D1 is different from the preset cruise direction of the mobile robot 1, the mobile robot 1 first moves toward the CoG offset direction D1 to provide the reverse force, and then move ahead toward the preset cruise direction after the CoG position 5 is determined to be back to the steady zone 14.

Figure 7:
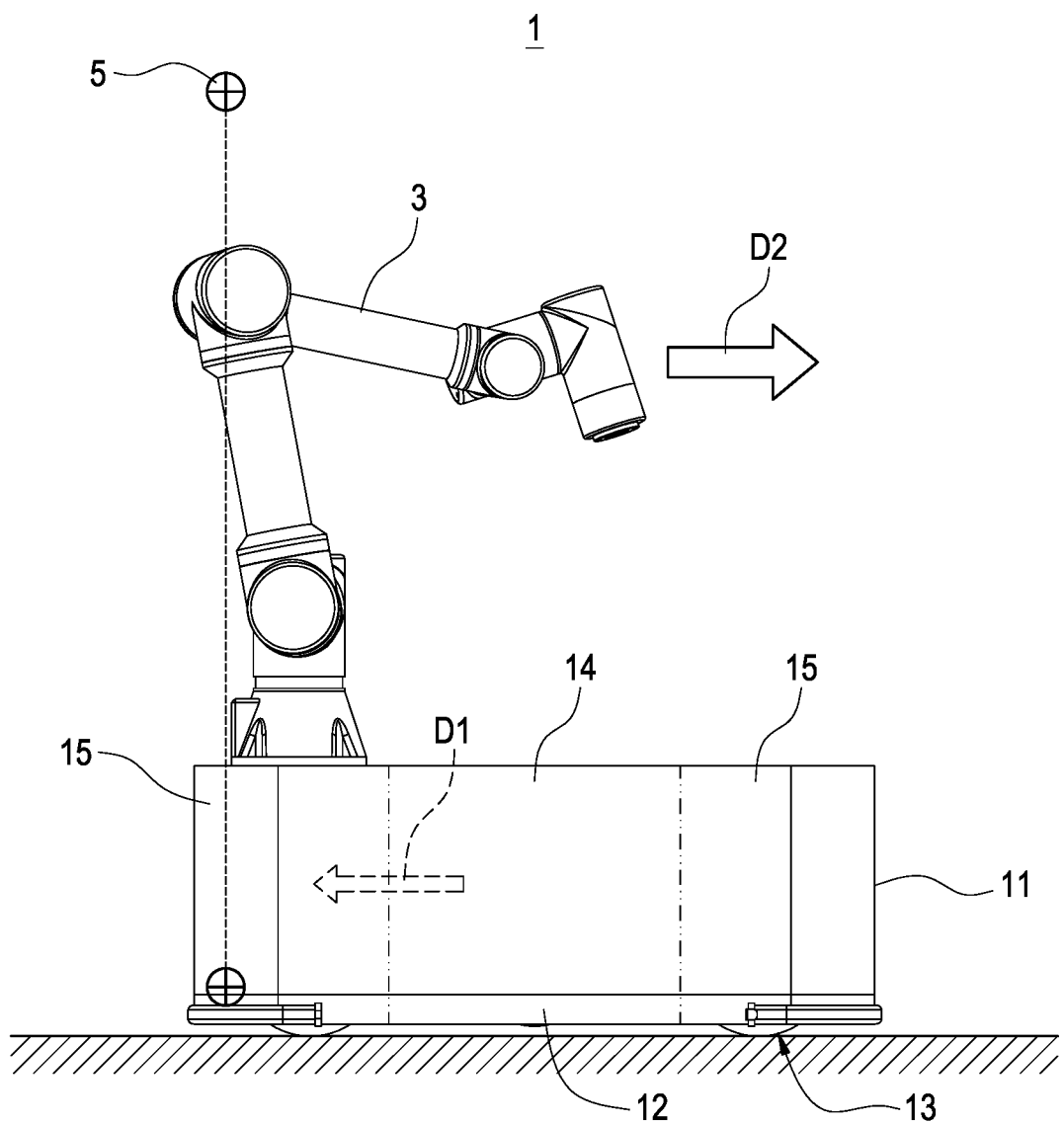
FIG. 7 is a schematic diagram showing a CoG compensation action of a second embodiment according to the present disclosure.

Please refer to FIG. 7, which is a schematic diagram showing a CoG compensation action of a second embodiment according to the present disclosure. In the embodiment of FIG. 7, the controller 10 controls the movable tool 3 (such as a robotic arm) arranged on the body 11 to perform the CoG compensation action when determining that the CoG position 5 is located out of the steady zone 14.

As shown in FIG. 7, the CoG compensation action is that the controller 10 controls the movable tool 3 to perform the posture adjustment procedure. In particular, the posture adjustment procedure is performed to adjust the position and the posture of the movable tool 3, so that the movable tool 3 may move its tool CoG toward an opposite direction D2 against the CoG offset direction D1 of the CoG position 5 with respect to the steady zone 14. To provide the reverse force against the CoG offset direction D1 through the inverted movement of the movable tool 3, the CoG position 5 may be moved from the compensation zone 15 back to the steady zone 14. When adjusting the position and posture of the movable tool 3, the posture adjustment procedure may be the movable tool 3 rotating or stretching toward a specific direction. In one embodiment, the movable tool 3 may first grab a payload being put on the body 11 and then rotate or stretch; therefore, affecting the CoG position 5 more easily.

Figure 8A:
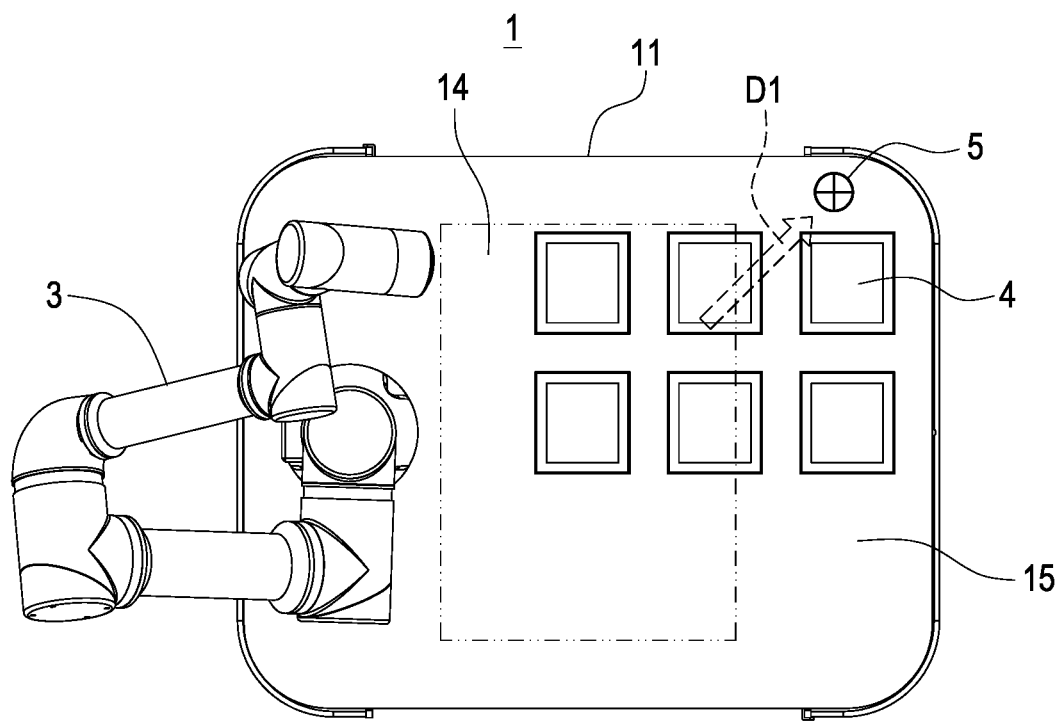
FIG. 8A is a schematic diagram showing a status before a CoG compensation action of a third embodiment according to the present disclosure.
Figure 8B:
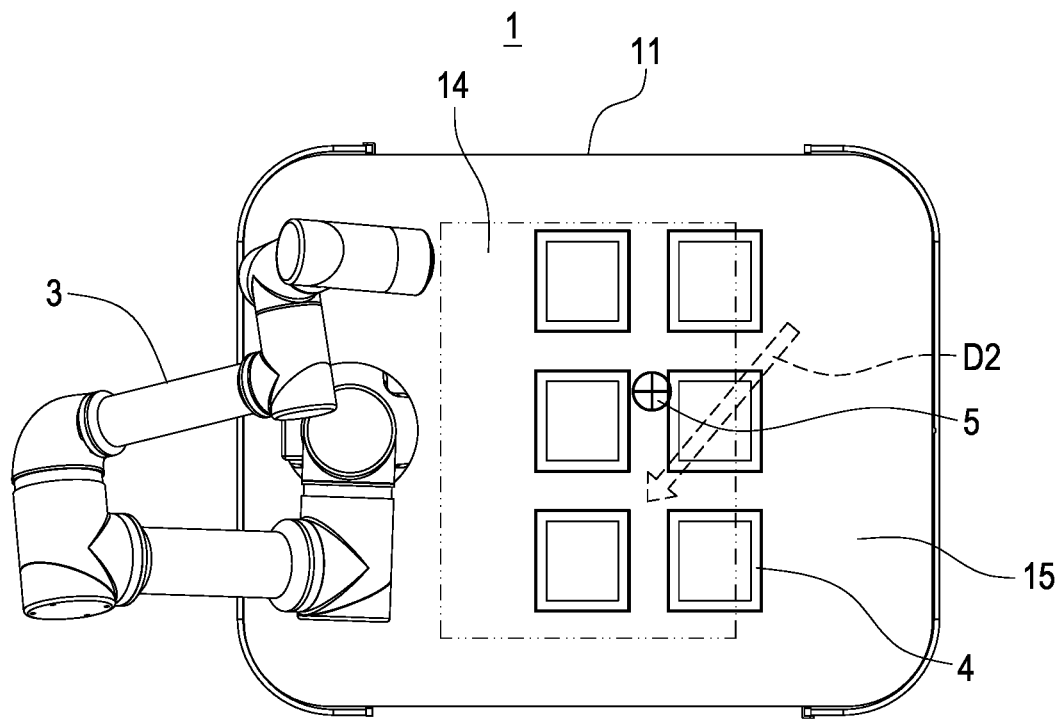
FIG. 8B is a schematic diagram showing a status after the CoG compensation action of the third embodiment according to the present disclosure.

Please refer to FIG. 8A and FIG. 8B, wherein FIG. 8A is a schematic diagram showing a status before a CoG compensation action of a third embodiment according to the present disclosure, and FIG. 8B is a schematic diagram showing a status after the CoG compensation action of the third embodiment according to the present disclosure.

In the embodiment of FIG. 8A and FIG. 8B, the controller 10 controls the movable tool 3 (such as a robotic arm) arranged on the body 11 to perform the CoG compensation action when determining that the CoG position 5 is located out of the steady zone 14. As shown in the FIGS., the CoG compensation action is that the controller 10 controls the movable tool 3 to adjust the placement position of one or more payloads 4 being put on the body 11.

In one embodiment, the adjustment for the placement position is that the controller 10 controls the movable tool 3 to grab and move at least one payload 4 on the body 11, so that the placement position of the at least one payload 4 on the body 11 may be moved from the compensation zone 15 to the steady zone 14. Besides, when the controller 10 determines that the CoG position 5 returns to the steady zone 14, the controller 10 may stop adjusting the placement position of rest of the payload(s) 4. In other words, even if a part of the payloads 4 are still put within the compensation zone 15, once the CoG position 5 returns to the steady zone 14, the controller 10 may stop controlling the movable tool 3 to adjust the placement position of rest of the payload(s) 4.

In one embodiment, the controller 10 may decide whether to adjust the placement position of the payload 4 while the mobile robot 1 is moving along a preset cruise in accordance with a location of the CoG position 5 within the compensation zone 15. For example, if the controller 10 determines that the location of the CoG position 5 within the compensation zone 15 is close to a peripheral part of the compensation zone 15 (wherein the peripheral part of compensation zone 15 is away from the steady zone 14), the controller 10 may first control the mobile robot 1 to stop moving along the preset cruise, and then control the mobile robot 1 to continue the movement on the preset cruise after the placement position of the payload 4 is finished adjusting. For another example, if the controller 10 determines that the location of the CoG position 5 within the compensation zone 15 is close to an inner part of the compensation zone 15 (wherein the inner part of the compensation zone 15 is near to the steady zone 14), the controller 10 may control the mobile robot 1 to remain the movement on the preset cruise and control the movable tool 3 to adjust the placement position of the payload 4 simultaneously without stopping the movement of the mobile robot 1 on the preset cruise.

In the disclosure, the controller 10 or the movable tool 3 may determine the current distribution of the one or more payloads 4 being put on the body 11 based on the pressure distribution measured by the plane-pressure sensor 2. In other words, the controller 10 or the movable tool 3 may analyze whether the payloads 4 exist at each location point of the top face 111 (such as the payload area 1111) of the body 11 or not through the plane-pressure sensor 2. Also, the controller 10 or the movable tool 3 may analyze the quantity of the payloads 4 at each location point of the top face 111 (such as the payload area 1111) of the body 11 through the plane-pressure sensor 2.

When the CoG position 5 is located out of the steady zone 14, the movable tool 3 may be controlled by the controller 10 to grab one or more payloads 4 at a corresponding location point(s) of the body 11 and move the grabbed payloads 4 toward an opposite direction D2 against the CoG offset direction D1 of the CoG position 5 with respect to the steady zone 14. To adjust the CoG position 5 of the whole mobile robot 1 through the inverted movement of the movable tool 3 incorporated with the payload(s) 4, the CoG position 5 of the mobile robot 1 may be moved from the compensation zone 15 back to the steady zone 14.

In another embodiment, the mobile robot 1 may record the change of the pressure value at each location point of the body 11 through the plane-pressure sensor 2 while a user puts the payloads 4 on the mobile robot 1 (e.g., during the warehouse management). Therefore, the mobile robot 1 may record whether the payloads 4 exist at each location point of the body 11, and may dynamically record payload information such as type or quantity of the payloads, and whether the payloads are movable or immovable, etc. When performing the CoG compensation action, the controller 10 or the movable tool 3 may analyze the payload information, the current CoG position 5, and the CoG offset direction D1 to decide a target payload(s) being moved and a moving end point of the target payload(s).

It should be mentioned that, if the plane-pressure sensor 2 includes the multiple pivot pressure sensors respectively arranged at each axle pivot of the wheels, the controller 10 may execute an algorithm to compute the change of the pressure value sensed by the multiple pivot pressure sensors, so as to estimate the distribution of the payloads 4 being put on each location point of the body 11.

In another embodiment, the mobile robot 1 may be arranged with an image sensor (such as a camera, but not shown in the FIGS.) on the body 11. In the embodiment, the mobile robot 1 may identify and track the placement status of the payloads 4 through the image sensor when a user puts the payloads 4 on the body 11. When performing the CoG compensation action, the controller 10 or the movable tool 3 may decide a target payload(s) being moved and a moving end point of the target payload(s) based on the placement status of the payloads 4 being recorded.

However, the above description is only one embodiment of the present disclosure, but not limited thereto.

Please refer back to FIG. 4. While the mobile robot 1 operates, the controller 10 continuously determines whether to terminate controlling the mobile robot 1 or not (step S18). For example, the controller 10 may continuously control the mobile robot 1 until the mobile robot 1 is turned off. Before terminating the control for the mobile robot 1, the controller 10 re-executes the step S10 through the step S16 to continuously monitor the CoG position 5 of the mobile robot 1 while the mobile robot 1 operates and to dynamically compensate the CoG position 5 through the movement mechanism 13, the movable tool 3 and/or the payload 4 when the CoG position 5 is determined to be satisfying a preset compensation condition (i.e., located out of the steady zone 14 and within the compensation zone 15). Therefore, the mobile robot 1 may be prevented from overturning while operation.

In part of scenarios, the mobile robot 1 may not carry the payload(s) 4. Even if the mobile robot 1 carries a payload 4, the payload 4 may be an immovable payload 4, or the payload 4 may be moved to cause only a tiny change to the CoG position 5. Therefore, the controller 10 may execute a preset determination procedure in advance before performing the CoG compensation action.

Figure 5:
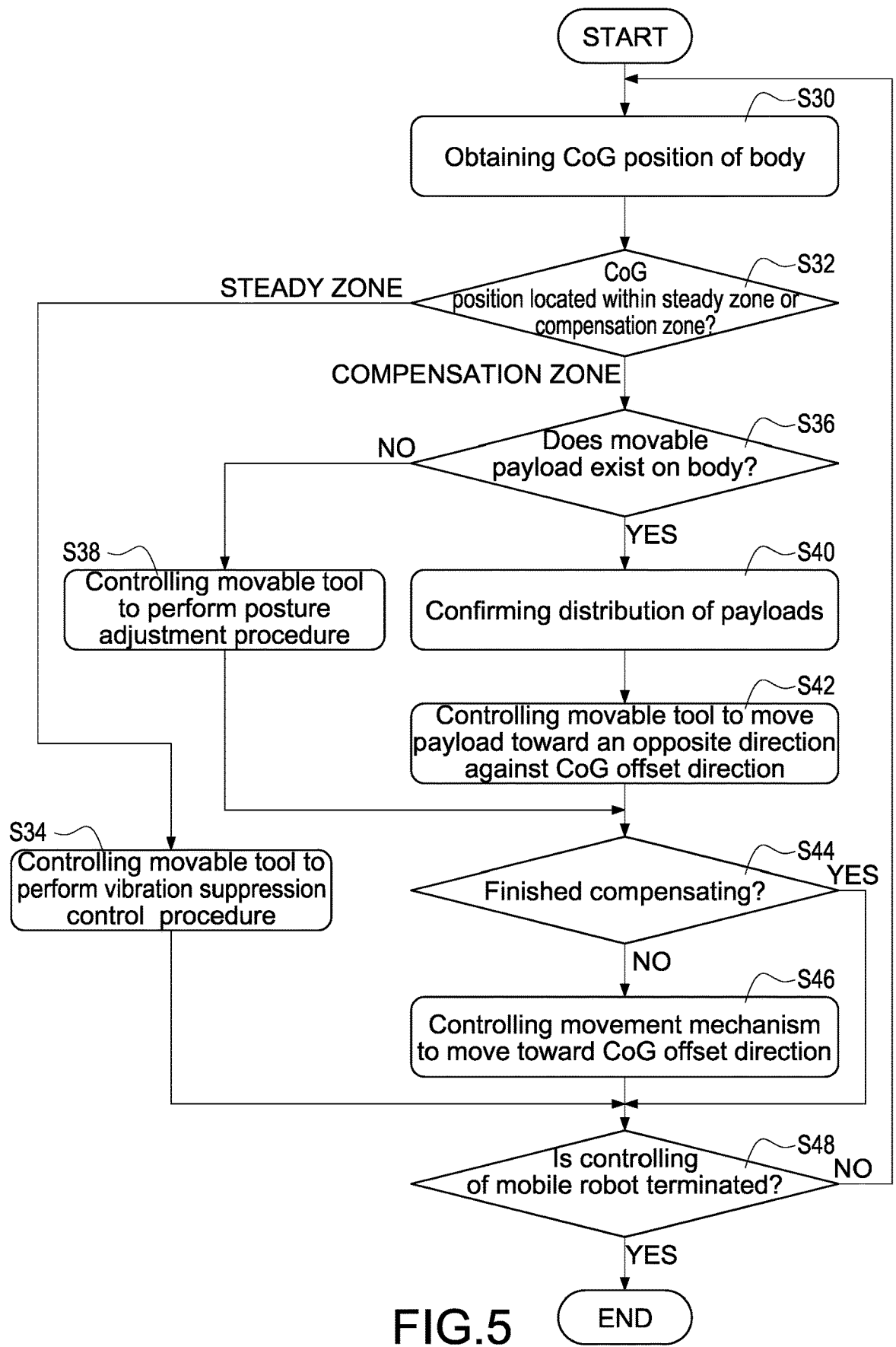
FIG. 5 is a flowchart of a stabilization method of a second embodiment according to the present disclosure.

Please refer to FIG. 5, which is a flowchart of a stabilization method of a second embodiment according to the present disclosure. FIG. 5 discloses another embodiment of the stabilization method of the present disclosure, and the stabilization method may be incorporated with the mobile robot 1 shown in FIG. 1 to FIG. 3.

Similar to the embodiment of FIG. 4, the stabilization method disclosed in FIG. 5 may measure the pressure distribution of the body 11 through the plane-pressure sensor 2 of the mobile robot 1 and compute the CoG position 5 of the body 11 by the controller 10 based on the pressure distribution (step S30). After the CoG position 5 is computed, the controller 10 determines whether the current CoG position 5 is within the steady zone 14 or compensation zone 15 that are pre-defined upon the body 11 (step S32).

If the CoG position 5 is located within the steady zone 14, it is unnecessary for the controller 10 to compensate the CoG position 5. If the mobile robot 1 is arranged with the movable tool 3 having the IMU 31, the controller 10 may control the movable tool 3 to perform the vibration suppression control procedure based on the value measured by the IMU 31 (step S34). Therefore, the mobile robot 1 may implement a suppression function to the regular vibration through the movable tool 3.

If the CoG position 5 is located within the compensation zone 15, the controller 10 may first control the movable tool 3 to perform the posture adjustment procedure to compensate the CoG position 5. As disclosed above, the compensation made by the movable tool 3 includes adjusting the position and the posture of the movable tool 3 itself to compensate the CoG position 5 and moving the placement position of the payload 4 being put on the body 11 to compensate the CoG position 5.

In the embodiment, the controller 10 determines whether a movable payload 4 exists on the body 11 when the CoG position 5 is determined to be within the compensation zone 15 (step S36). In one embodiment, the controller 10 in the step S36 may determine whether the movable payload 4 exists on the body 11 based on the payload information recorded during the warehouse management. In another embodiment, the controller 10 in the step S36 may determine whether the movable payload 4 exists on the body 11 based on the value measured by the plane-pressure sensor 2 and/or the sensing result of the image sensor, but not limited thereto.

If the controller 10 determines in the step S36 that no payload 4 exists on the body 11 or only an immovable payload 4 exists on the body 11, the controller 10 controls the movable tool 3 to perform the posture adjustment procedure by itself (step S38). By adjusting the position and the posture of the movable tool 3 itself, the movable tool 3 may move its tool CoG toward the opposite direction D2 against the CoG offset direction D1 of the CoG position 5 with respect to the steady zone 14.

If the controller 10 determines that one or more movable payloads 4 exist on the body 11, the controller 10 confirms the distribution of the payloads 4 in accordance with the current pressure distribution (step S40), and the controller 10 controls the movable tool 3 to grab and move at least one payload 4 correspondingly toward the opposite direction D2 against the CoG offset direction D1 (step S42). In particular, the controller 10 in the step S40 decides a target payload(s) being moved, the quantity of the target payload(s), and a moving end point of the target payload(s) based on the distribution of the payloads 4, but not limited thereto.

After the step S38 or the step S42, the controller 10 determines whether the compensation to the CoG position 5 is finished (step S44). More specific, the controller 10 in the step S44 is to determine whether the CoG position 5 returns to the steady zone 14 or not after the CoG compensation action is performed through the movable tool 3 with or without the payload(s) 4.

If the controller 10 determines in the step S44 that the compensation to the CoG position 5 is not yet finished (i.e., the CoG position 5 is still located out of the steady zone 14), the controller 10 further controls the movement mechanism 13 to move toward the CoG offset direction D1 (step S46). By making the whole mobile robot 1 to output a force toward the CoG offset direction D1, the CoG position 5 of the whole mobile robot 1 may be moved back to the steady zone 14.

The approach of controlling the movement mechanism 13 to perform the CoG compensation action may cause the whole mobile robot 1 to move, which brings inconvenience to the usage of the mobile robot 1. In the above embodiment, the controller 10 first controls the movable tool 3 to compensate the CoG position 5, and controls the movement mechanism 13 only if the CoG position 5 is not well compensated by controlling the movable tool 3. However, the above description is only one of the embodiments of the present disclosure. In another embodiment, the controller 10 may decide the controlling approach and the controlling order of the movable tool 3, the movement mechanism 13, and the payloads 4 based on real demand (such as the current environment where the mobile robot 1 locates), and the order for the determination and the controlling are not limited to the above disclosure.

Similar to the embodiment of FIG. 4, the controller 10 in the embodiment of FIG. 5 may determine whether to terminate controlling the mobile robot 1 while the mobile robot 1 is operating (step S48). Before terminating the control for the mobile robot 1, the controller 10 re-executes the step S30 through the step S46 to continuously monitor the CoG position 5 of the mobile robot 1 and to dynamically compensate the CoG position 5 through the movement mechanism 13, the movable tool 3, and/or the payload 4.

Figure 9:
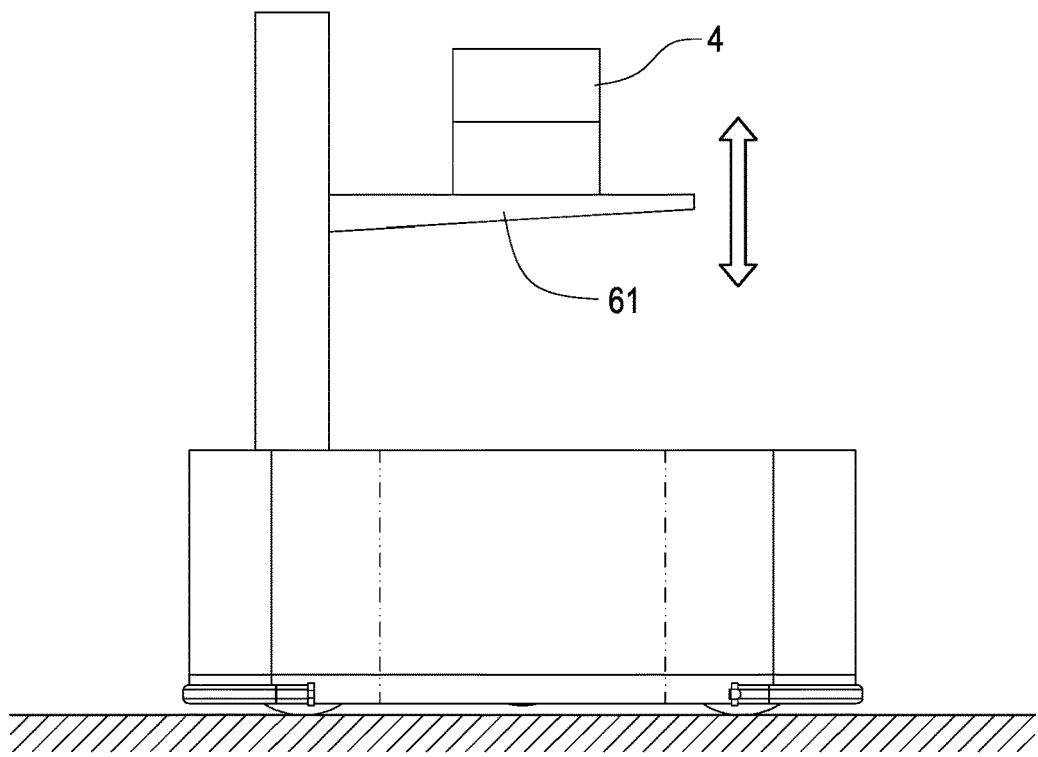
FIG. 9 is a schematic diagram of a mobile robot of a second embodiment according to the present disclosure.

In the embodiments of FIG. 1, FIG. 6, FIG. 7, FIG. 8A, and FIG. 8B as mentioned above, the movable tool 3 is exemplified as a robotic arm that is movable within a three-dimensional space. By controlling the robotic arm to adjust its position and posture in the three-dimensional space or to grab and change the placement position of the payloads 4, the purpose of the present disclosure that compensating the CoG position 5 of the whole mobile robot 1 may be implemented. However, the movable tool 3 is not limited to the robotic arm only, Please refer to FIG. 9, which is a schematic diagram of a mobile robot of a second embodiment according to the present disclosure. FIG. 9 discloses another embodiment of a mobile robot 6. In the embodiment of FIG. 9, the movable tool 3 of the mobile robot 6 is a pallet 61 that may move vertically within a two-dimensional space, wherein one or more payloads 4 may be put on the pallet 61.

When determining that the CoG position 5 of the mobile robot 6 is located out of the steady zone 14, the controller 10 in this embodiment may control the pallet 61 to perform the CoG compensation action based on the steps as discussed according to the embodiments of FIG. 4 and FIG. 5. In that scenario, the pallet 61 adjusts the height of the tool CoG through moving the payload(s) 4 up and down, so as to compensate the CoG position 5 of the whole mobile robot 6.

Figure 10:
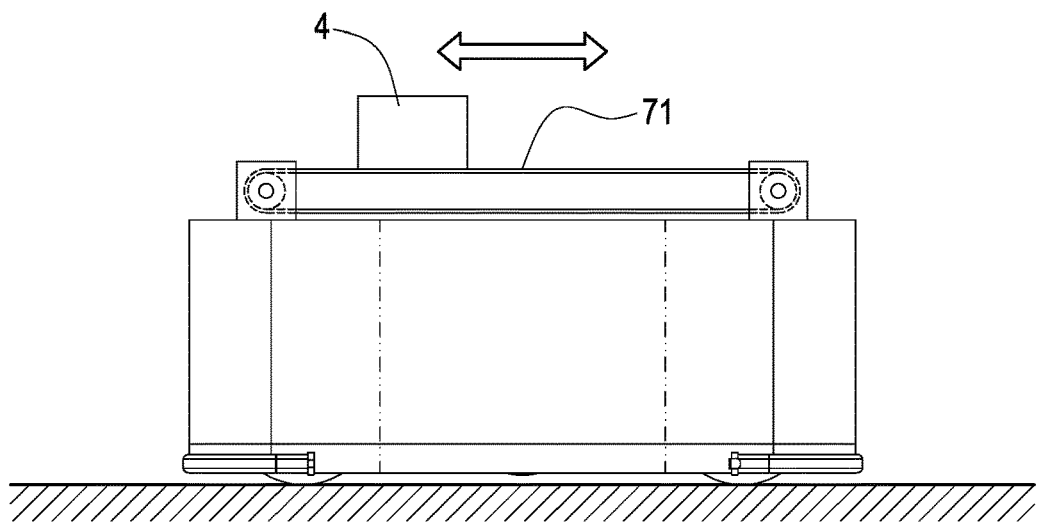
FIG. 10 is a schematic diagram of a mobile robot of a third embodiment according to the present disclosure.

Please refer to FIG. 10, which is a schematic diagram of a mobile robot of a third embodiment according to the present disclosure. FIG. 10 discloses another embodiment of a mobile robot 7. In the embodiment of FIG. 10, the movable tool 3 of the mobile robot 7 is a conveyor 71 that may move horizontally within a two-dimensional space, wherein one or more payloads 4 may be put on the conveyor 71.

When determining that the CoG position 5 of the mobile robot 7 is located out of the steady zone 14, the controller 10 in this embodiment may control the conveyor 71 to perform the CoG compensation action based on the steps as discussed according to the embodiments of FIG. 4 and FIG. 5. In that scenario, the conveyor 71 adjusts the position of the tool CoG through moving the payload(s) 4 forward, backward, leftward, and rightward, so as to compensate the CoG position 5 of the whole mobile robot 7.

However, the above descriptions are only few embodiments of the present disclosure, the movable tool 3 of the mobile robots 1, 6, and 7 is not limited to the aforementioned robotic arm, pallet 61, and conveyor 71. For example, the mobile robot may be a forklift, a reach truck, a very narrow aisle, a tow tractor, etc., and the movable tool 3 may be a lifting tool, a roller, a multiple/single picking tool, etc., but not limited thereto.

The present disclosure continuously computes the CoG position of the mobile robot and controls the components of the mobile robot to compensate the CoG position, so as to prevent the mobile robot from overturning due to the unstable of its CoG. Therefore, the mobile robot may be manufactured in a lightweight design, and the mobile robot may be further prevented from overturning due to the payloads added onto the mobile robot and causes the CoG of the mobile robot to move.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A mobile robot, comprising:
a body having a chassis, wherein the chassis is arranged with a movement mechanism;
a plane-pressure sensor arranged on the body, sensing a pressure distribution of the body to obtain a center of gravity (CoG) position of the body;
a movable tool arranged on the body; and
a controller connected with the movement mechanism, the plane-pressure sensor, and the movable tool, configured to control the movement mechanism or the movable tool to perform a CoG compensation action when the CoG position is located out of a steady zone of the body by applying a reverse force against a CoG offset direction for the CoG position to return to the steady zone, wherein the CoG offset direction is a direction of offset of the CoG position with respect to the stable region.

2. The mobile robot in claim 1, wherein the CoG compensation action comprises controlling the movement mechanism to move toward the CoG offset direction.

3. The mobile robot in claim 2, wherein the controller is configured to, when determining that the CoG offset direction and a preset cruise direction of the mobile robot are different, first control the movement mechanism to move toward the CoG offset direction to provide the reverse force, and then control the movement mechanism to move ahead toward the preset cruise direction after the CoG position returns to the steady zone.

4. The mobile robot in claim 1, wherein the CoG compensation action comprises controlling the movable tool to perform a posture adjustment procedure, and the posture adjustment procedure comprises adjusting a position and a posture of the movable tool to make a tool CoG of the movable tool moving toward an opposite direction against the CoG offset direction.

5. The mobile robot in claim 4, wherein the movable tool is configured to first grab a payload on the body and then adjust the position and the posture when performing the posture adjustment procedure.

6. The mobile robot in claim 4, wherein the body has a payload area at one side, and at least one payload is put on the payload area, wherein the CoG compensation action comprises controlling the movable tool to move the payload toward the opposite direction against the CoG offset direction.

7. The mobile robot in claim 6, wherein the controller is configured to control the movable tool to stop moving the payload when the CoG position is determined to be within the steady zone.

8. The mobile robot in claim 6, wherein the controller is configured to determine whether the movement mechanism moves or stops when the movable tool moves the payload based on the location of the CoG position.

9. A stabilization method, incorporated with a mobile robot having a body, and the body having a plane-pressure sensor, and the stabilization method comprising:
a) sensing a pressure distribution of the body through the plane-pressure sensor;
b) computing a center of gravity (CoG) position of the body based on the pressure distribution; and
c) performing a CoG compensation action when determining that the CoG position is located out of a steady zone that is close to a central position of the body, wherein the CoG compensation action is performed to provide a reverse force against a CoG offset direction of the CoG position with respect to the steady zone.

10. The stabilization method in claim 9, wherein the body comprises a chassis, and the chassis is arranged with a movement mechanism, wherein the step c) comprises controlling the movement mechanism to move toward the CoG offset direction.

11. The stabilization method in claim 9, wherein the body is arranged with a movable tool, and the step c) comprises controlling the movable tool to perform a posture adjustment procedure, wherein the posture adjustment procedure is performed to adjust a postion and a posture of the movable tool so that a tool CoG of the movable tool moves toward an opposite direction against the CoG offset direction.

12. The stabilization method in claim 11, wherein the body comprises a payload area at one side, a payload is put on the payload area, and the step c) comprises controlling the movable tool to move the payload toward the opposite direction against the CoG offset direction.

13. The stabilization method in claim 9, further comprises a step d): controlling a movable tool of the body to perform a vibration suppression control procedure when determining that the CoG position is located within the steady zone.

14. A stabilization method, incorporated with a mobile robot having a body, the body having a plane-pressure sensor and a movable tool, and the stabilization method comprising:
 a) sensing a pressure distribution of the body through the plane-pressure sensor;
 b) computing a center of gravity (CoG) position of the body based on the pressure distribution;
 c) determining whether the CoG position is located within a steady zone or a compensation zone, wherein the steady zone is close to a central position of the body and the compensation zone is close to a peripheral position of the body;
 d) determining whether a payload that is movable exists on the body;
 e) controlling the movable tool to perform a posture adjustment procedure when no payload exists on the body or an immovable payload exists on the body, wherein the posture adjustment procedure is performed to adjust a position and a posture of the movable tool so that a tool CoG of the movable tool moves toward an opposite direction to a CoG offset direction of the CoG position with respect to the steady zone;
 f) confirming a distribution of the payload based on the pressure distribution when the payload that is movable exists on the body; and
 g) after the step f), controlling the movable tool to move the payload toward the opposite direction.

* * * * *